(12) United States Patent
Martinez-Minguito (10) Patent No.: US 11,089,561 B2
(45) Date of Patent: Aug. 10, 2021

(54) SIGNAL PLANE PROTECTION WITHIN A COMMUNICATIONS NETWORK

(71) Applicant: TELEFONAKTIEBOLAGET LM ERICSSON (PUBL), Stockholm (SE)

(72) Inventor: Julio Martinez-Minguito, Älvsjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/638,299

(22) PCT Filed: Sep. 12, 2017

(86) PCT No.: PCT/EP2017/072908
§ 371 (c)(1),
(2) Date: Feb. 11, 2020

(87) PCT Pub. No.: WO2019/052637
PCT Pub. Date: Mar. 21, 2019

(65) Prior Publication Data
US 2020/0229118 A1    Jul. 16, 2020

(51) Int. Cl.
*H04W 60/00* (2009.01)
*H04W 76/12* (2018.01)
*H04B 7/02* (2018.01)
*H04B 7/0413* (2017.01)
*H04B 7/0491* (2017.01)
*H04B 7/06* (2006.01)
(Continued)

(52) U.S. Cl.
CPC .............. *H04W 60/00* (2013.01); *H04B 7/02* (2013.01); *H04B 7/0413* (2013.01); *H04B 7/0491* (2013.01); *H04B 7/0697* (2013.01); *H04L 65/1016* (2013.01); *H04W 12/04* (2013.01); *H04W 76/12* (2018.02); *H04W 80/04* (2013.01)

(58) Field of Classification Search
CPC .......... H04L 65/1006; H04L 29/06027; H04L 65/1073; H04L 65/1016; H04L 61/3085; H04W 60/00; H04W 80/00; H04W 8/26; H04W 92/02; H04W 12/02
See application file for complete search history.

(56) References Cited

U.S. PATENT DOCUMENTS

| | | | |
|---|---|---|---|
| 2005/0048971 A1* | 3/2005 | Findikli | G06F 21/10 455/435.1 |
| 2005/0135388 A1* | 6/2005 | Hartikainen | H04W 12/06 370/401 |

(Continued)

OTHER PUBLICATIONS

"3rd Generation Partnership Project; Technical Specification Group Services and System Aspects; 3G security; Access-security for IP-based services," 3GPP TS 33.203, Jun. 2017, pp. 1-145, V14.1.0.

(Continued)

*Primary Examiner* — Fred A Casca
(74) *Attorney, Agent, or Firm* — Patent Portfolio Builders PLLC (57) ABSTRACT

A method of securely registering a User Equipment, UE, with an IP Multimedia Subsystem, IMS, network. The method comprises sending from the UE to the IMS network, a Session Initiation Protocol, SIP, REGISTER message comprising information encrypted using the public key part of a public-private key pair belonging to the IMS network or to a controller of the IMS network.

18 Claims, 9 Drawing Sheets

(51) Int. Cl.
*H04L 29/06* (2006.01)
*H04W 12/04* (2021.01)
*H04W 80/04* (2009.01)

(56) References Cited

U.S. PATENT DOCUMENTS

| | | | | | |
|---|---|---|---|---|---|
| 2005/0276415 | A1* | 12/2005 | Brett | ............... | H04L 9/0891 |
| | | | | | 380/201 |
| 2006/0059337 | A1* | 3/2006 | Poyhonen | ........... | H04L 61/1511 |
| | | | | | 713/165 |
| 2007/0060097 | A1* | 3/2007 | Edge | ............... | H04W 8/205 |
| | | | | | 455/404.1 |
| 2007/0093239 | A1* | 4/2007 | Camp, Jr. | ......... | H04N 21/4181 |
| | | | | | 455/418 |
| 2009/0198997 | A1* | 8/2009 | Yeap | ............... | H04L 51/28 |
| | | | | | 713/155 |
| 2009/0252309 | A1* | 10/2009 | Beyer | ............... | H04W 12/06 |
| | | | | | 379/93.02 |
| 2010/0263032 | A1* | 10/2010 | Bhuyan | ............ | H04L 63/168 |
| | | | | | 726/7 |
| 2014/0068710 | A1* | 3/2014 | Lau | ............... | H04L 12/66 |
| | | | | | 726/3 |
| 2014/0248887 | A1* | 9/2014 | Alkabra | ............ | H04W 4/021 |
| | | | | | 455/445 |
| 2016/0050272 | A1* | 2/2016 | Raduchel | ........... | H04L 67/1095 |
| | | | | | 709/204 |
| 2016/0119378 | A1* | 4/2016 | Khalil | ............... | H04W 12/08 |
| | | | | | 726/14 |
| 2016/0164883 | A1* | 6/2016 | Li | ............... | H04W 12/0023 |
| | | | | | 726/7 |
| 2016/0359824 | A1 | 12/2016 | Faynberg et al. | | |
| 2017/0026422 | A1* | 1/2017 | Klein | ............... | H04L 45/02 |
| 2018/0205698 | A1* | 7/2018 | Gupta | ............... | H04L 67/146 |
| 2018/0367530 | A1* | 12/2018 | Mistry | ............... | H04L 65/1069 |

OTHER PUBLICATIONS

International Search Report/Written Opinion in related/corresponding PCT Application No. PCT/EP2017/072908 dated May 14, 2018.

* cited by examiner

```
REGISTER sip:ims.mnc080.mcc262.3gppnetwork.org SIP/2.0
From:
<sip:+4916580180260@ims.mnc080.mcc262.3gppnetwork.org>;t
ag=1436313140
To:
<sip:+4916580180260@ims.mnc080.mcc262.3gppnetwork.org>
CSeq: 362571312 REGISTER
Call-ID:
1436313136_174255384@2001:1b70:82b0:7102:aede:ad6c:678d:4
de0
Via: SIP/2.0/UDP
[2001:1b70:82b0:7102:aede:ad6c:678d:4de0]:5070;branch=z9h
G4bK2209682859
Max-Forwards: 70
Contact:
<sip:+4916580180260@[2001:1b70:82b0:7102:aede:ad6c:678d:
4de0]:5070>;+sip.instance="<urn:gsma:imei:35160200-
294098-0>";+g.3gpp.icsi-ref="urn%3Aurn-7%3A3gpp-
service.ims.icsi.mmtel";+g.3gpp.smsip;video
Route: <sip:[2001:1b70:8294:8b2::2121:5060;lr>
Content-Length: 0
Authorization: Digest
uri="sip:ims.mnc080.mcc262.3gppnetwork.org",username="262
8008018206@ims.mnc080.mcc262.3gppnetwork.org",response=
"",realm="ims.mnc080.mcc262.3gppnetwork.org",nonce=""
Expires: 900
Require: sec-agree
Proxy-Require: sec-agree
Supported: path,sec-agree
Allow: INVITE,MESSAGE,OPTIONS
Security-Client: ipsec-3gpp; alg=hmac-md5-96; ealg=null;
spi-c=132912898; spi-s=648484956; port-c=8197; port-
s=8903
```

*Figure 4*

```
REGISTER sip:ims.mnc080.mcc262.3gppnetwork.org SIP/2.x
From:
Encrypted-content: <encrypted_data>

With encrypted_data = asymetric_encryption_function
(IMS_public_key,
From:
<sip:+4916580180260@ims.mnc080.mcc262.3gppnetwork.org>;t
ag=1436313140
To:
<sip:+4916580180260@ims.mnc080.mcc262.3gppnetwork.org>
CSeq: 362571312 REGISTER
Call-ID:
1436313136_174255384@2001:1b70:82b0:7102:aede:ad6c:678d:4
de0
Via: SIP/2.0/UDP
[2001:1b70:82b0:7102:aede:ad6c:678d:4de0]:5070;branch=z9h
G4bK2209682859
Max-Forwards: 70
Contact:
<sip:+4916580180260@[2001:1b70:82b0:7102:aede:ad6c:678d:
4de0]:5070>;+sip.instance="<urn:gsma:imei:35160200-
294098-0>";+g.3gpp.icsi-ref="urn%3Aurn-7%3A3gpp-
service.ims.icsi.mmtel";+g.3gpp.smsip;video
Route: <sip:[2001:1b70:8294:8b2::2121:5060;lr>
Content-Length: 0
Authorization: Digest
uri="sip:ims.mnc080.mcc262.3gppnetwork.org",username="262
8008018206@ims.mnc080.mcc262.3gppnetwork.org",response=
"",realm="ims.mnc080.mcc262.3gppnetwork.org",nonce=""
Expires: 900
Require: sec-agree
Proxy-Require: sec-agree
Supported: path,sec-agree
Allow: INVITE,MESSAGE,OPTIONS
Security-Client: ipsec-3gpp; alg=hmac-md5-96; ealg=null;
spi-c=132912898; spi-s=648484956; port-c=8197; port-
s=8903
P-Client-Public-Key: 1243abcf124…
Content-Length: 0 )
```

*Figure 5*

```
SIP/2.0 401 Unauthorized
Encrypted-content: <encrypted_data>

With encrypted_data = asymetric_encryption_function (UE_public_key,
        Via: SIP/2.0/UDP
        [2001:1b70:82b0:7102:aede:ad6c:678d:4de0]:5070;branch=z9hG4bK2
        209682859
        To:
        <sip:+49165801802060@ims.mnc080.mcc262.3gppnetwork.org>;tag=h7
        g4Esbg_62215e8f0383af70b9f2fd8fba82a2
        From:
        <sip:+49165801802060@ims.mnc080.mcc262.3gppnetwork.org>;tag=14
        36313140
        Call-ID:
        1436313136_174255384@2001:1b70:82b0:7102:aede:ad6c:678d:4de0
        CSeq: 362571312 REGISTER
        Security-Server: ipsec-3gpp;q=0.5;alg=hmac-md5-
        96;prot=esp;mod=trans;ealg=null;spi-c=1881119369;spi-
        s=954386257;port-c=7801;port-s=7800
        Service-Route:
        <sip:[2001:1B70:8294:8B2::212]:5060;transport=udp;lr>
        WWW-Authenticate: Digest
        realm="tcu.ics.se",nonce="eau4xV1CZJQP+Nii/lPH0pSFmlRu/gAAAzWM
        LVwGZjs=",algorithm=AKAv1-MD5,qop="auth"
        Content-Length: 0 )
```

SIGNAL PLANE PROTECTION WITHIN A COMMUNICATIONS NETWORK

TECHNICAL FIELD

The present invention relates to a method and apparatus for securely registering a User Equipment (UE) with an IP Multimedia Subsystem (IMS) network. More particularly, the invention relates to securing information sent between the UE and the IMS via Session Initiation Protocol, SIP, signalling during registration of the UE with the IMS network.

BACKGROUND

The Internet Protocol (IP) Multimedia Subsystem (IMS) is a well-known Third Generation Partnership Project (3GPP) standard allowing sessions to be set up between two or more parties for a broad variety of services such as voice or video call, interactive messaging sessions or third party specific applications. A few common enablers are defined by 3GPP for common usage among all these services. Examples of such enablers are capability discovery and subscribing to conference events to be used by for example an ad-hoc voice call conference for clients/devices to identify who leaves and enters the conference.

The signalling protocol chosen by 3GPP is the Session Initiation Protocol (SIP). SIP is an application layer protocol used for controlling multimedia sessions over IP networks. It is a text based protocol which uses the request/response model. SIP defines messages sent between endpoints, which govern establishment, termination and other essential elements of a multimedia connection. SIP can be used for creating, modifying and terminating sessions consisting of one or more media streams. It can be both unicast and multicast. Examples of applications which SIP can establish and control are video conferencing, streaming multimedia distribution, instant messaging, presence information, file transfer, fax over IP and online games.

SIP provides a mechanism for the registration of user agents and for setting up multimedia sessions. The SIP REGISTER method enables the registration of a user agent's current location and the INVITE method enables the setting up of a session.

SIP does not only allow the registration of users and the set-up of connections. Modification of sessions is also possible, such as adding media to a session or new user agents joining multicast sessions such as video conferencing. In order to assist a user agent in discovering the capabilities of other user agents and events that occur within the session, a number of other SIP methods have been developed. The SIP OPTIONS method enables a user agent to query another user agent or proxy server about its capabilities. This allows a client to discover information about supported methods, content types, extensions, codecs etc. The SUBSCRIBE method is used to request asynchronous notification of an event or set of events at a later time. It is complemented by the NOTIFY command by which these notifications are enacted.

Although SIP enablers such as SUBSCRIBE and OPTIONS are powerful, they are also resource intensive and use valuable signalling bandwidth. IMS separates the control functions and the user traffic, and resource intensive methods such as those used by SIP can place a strain on resources dedicated to signalling within the IMS. For example, signalling must be routed through the home network. Acknowledgement and retransmission messages as well as provisional responses are incorporated in SIP which increase the amount of signalling required. In addition, new logic and commands for networks can only be developed through the standardisation process.

The Session Description Protocol (SDP) is used within SIP signalling to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS. The term UE is used here as it is defined by 3GPP, or evolutions thereof.

Figure 1:
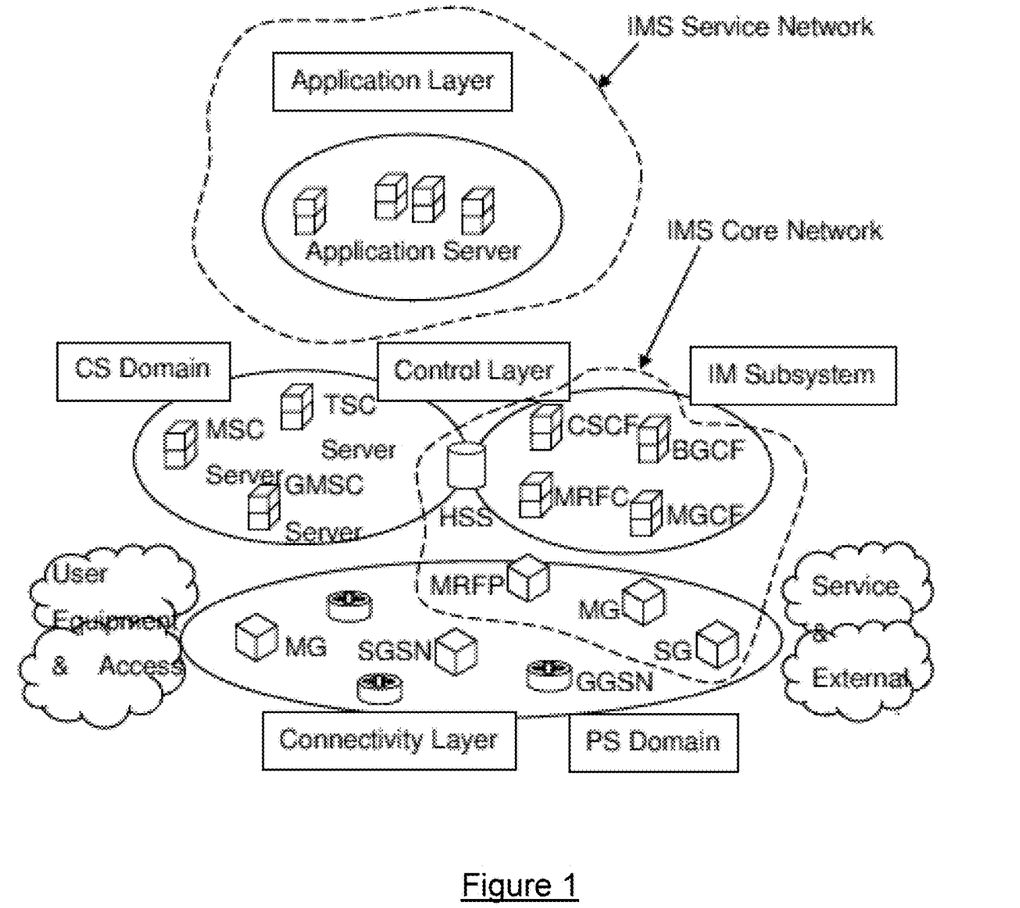
FIG. 1 illustrates schematically an IMS network integrated into a communications system comprising a 3G network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

To protect the integrity and confidentiality of SIP signalling, the network protocol Internet Protocol Security (IPsec) is commonly used. This involves establishing a secure connection between the UE and the IMS based on information shared between the UE and the IMS. This shared information may include, for example, which cryptographic algorithm should be used and the parameters and encryption keys necessary for using the algorithm. The security attributes shared between the UE and the IMS are referred to collectively as an IPsec Security Association (SA). Typically, the authentication and the negotiation of the IPsec SA is performed based on a secret key which is stored in the user's Universal Integrated Circuit Card (UICC), also known as a Subscriber Identity Module (SIM), and on a secret key for the IMS stored in the Home Subscriber Server (HSS). The standardised process of mutual authentication of the UE and IMS and the establishment of the IPSec SAs is referred to as IMS Authentication and Key Agreement (IMS-AKA).

Before a user can access IMS services, the UE must first register an IP Multimedia Public Identity (IMPU) with the IMS, typically in the form of a uniform resource identifier (uri) based on, for example, the user's telephone number. Registration is initiated by the UE sending a SIP REGISTER message containing the IMPU to the P-CSCF to which the UE has been assigned. The IMS may then reply to the UE via the P-CSCF, e.g. to request authentication of the UE. After this initial exchange, IMS-AKA is then used to establish the IPSec SAs for securing the SIP signalling between the UE and the P-CSCF. However, user information is partially exposed because the IPSec SAs are established only after the SIP REGISTER message and the IMS response have been exchanged. An eavesdropper located between the UE and the P-CSCF, e.g. at the packet data network gateway, may therefore gain access to user activity data by intercepting the initial SIP REGISTER message and the reply from the IMS.

The initial SIP signalling between the UE and IMS can be protected by using the Transport Layer Security (TLS) protocol to establish a secure connection prior to the UE initiating registration. After the SIP REGISTER and SIP response messages have been exchanged the TLS connection can then be replaced by an IPSec connection. However, establishing a TLS connection requires handshake negotiations which consume network capacity and is considered a "heavyweight" process for protecting the exchange of a small number of messages. Additionally, executing the TLS protocol may lead to longer registration times for IMS users.

It is therefore desirable to have a process for securely registering a UE with the IMS which does not suffer from the limitations described above.

SUMMARY

According to a first aspect of the invention, there is provided a method of securely registering a User Equipment, UE, with an IP Multimedia Subsystem, IMS, network. The method comprises sending from the UE to the IMS network, a Session Initiation Protocol, SIP, REGISTER message comprising information encrypted using the public key part of a public-private key pair belonging to the IMS network or to a controller of the IMS network.

The information may comprise one or more of: an IMS Private Identifier, IMPI; an IMS Public Identifier, IMPU; and IMS Authentication and Key Agreement, IMS-AKA, data.

The information may further comprise the public key part of a public-private key pair belonging to the UE. A method may comprise, at the UE, receiving from the IMS network a SIP 401 response message comprising response information encrypted using the public key belonging to the UE.

The response information may comprise an authentication value for the IMS network and/or a random number generated by the IMS network as an authentication challenge for the UE.

The public-private key pair belonging to the IMS network or to a controller of the IMS network may belong to a controller of the IMS network acting as a Proxy Call Session Control Function, P-CSCF.

The method may comprise receiving the SIP REGISTER message at the controller and decrypting the encrypted information using the private key part of the public-private key pair of the controller. The step of decrypting may be conditional on the SIP REGISTER message comprising an indicator to indicate that the message comprises encrypted information. The step of decrypting the encryption information may be performed by a node of the IMS network other than the controller.

The IMS public key may be stored at the UE, optionally in a Universal Integrated Circuit Card, UICC, prior to the UE connecting to the IMS network.

The method may comprise, at the UE, receiving the IMS public key from a node of the IMS network or from a node of an access network through which the IMS network is accessed.

The node may be a Packet Data Gateway, PGW of an access network through which the IMS network is accessed. The node may be a Dynamic Host Configuration Protocol, DHCP, server of the access network.

The node may be a device configuration server of the IMS or a controller of the IMS network acting as a P-CSCF or an Application Server of the IMS.

The public-private key pair belonging to the UE may be generated by the UE.

According to a second aspect of the invention, there is provided an apparatus configured to operate as a controller of an IP Multimedia Subsystem, IMS, network. The apparatus comprises: processor circuitry; a storage unit storing instructions executable by the processor circuitry, a receiver for receiving messages and a transmitter for sending messages. The apparatus is operable to: receive, from a User Equipment, UE, a Session Initiation Protocol, SIP, REGISTER message comprising information encrypted using the public key part of a public-private key pair belonging to the IMS network or to the controller; and decrypt the encrypted information using the private key part of the public-private key pair.

The apparatus may be operable to decrypt the encrypted information only in response to the SIP REGISTER message comprising an indicator to indicate that the information is encrypted.

The apparatus may be operable to use a public encryption key contained in the SIP REGISTER message to encrypt response information and to send the encrypted response information to the UE in a SIP 401 response message.

The apparatus may be configured to operate as a Proxy Call Session Control Function, P-CSCF.

According to a third aspect of the invention, there is provided an apparatus configured to operate as a User Equipment of an IP Multimedia Subsystem, IMS, network, the apparatus comprising: processor circuitry; a storage unit storing instructions executable by the processor circuitry, a receiver for receiving messages and a transmitter for sending messages. The apparatus is operable to: encrypt information using the public key part of a public-private key pair belonging to the IMS network or to a controller of the IMS network; and send to the IMS network a Session Initiation Protocol, SIP, REGISTER message comprising the encrypted information.

The information may comprise a public key part of a public-private key pair belonging to the UE.

The apparatus may be operable to receive from the IMS network a SIP message comprising response information encrypted using the public key belonging to the UE, and decrypt the response information using the private key part of the public-private key pair belonging to the UE.

BRIEF DESCRIPTION OF THE DRAWINGS

FIG. 4 shows an example of a SIP REGISTER message known in the prior art;

FIG. 5 shows a SIP REGISTER message according to an embodiment of the present invention;

DETAILED DESCRIPTION

Embodiments will now be described more fully below with reference to the accompanying drawings. However, other embodiments in many different forms are possible within the scope of the present disclosure. The following embodiments are therefore provided by way of example only so that this disclosure will be thorough and complete, and will fully convey the scope of the disclosure to those skilled in the art.

Figure 2:
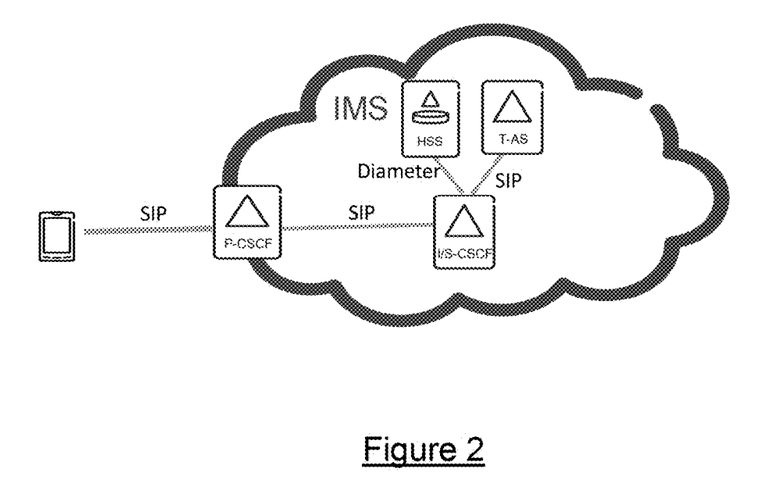
FIG. 2 illustrates schematically a UE connected to an IMS network.

In order to address the problems discussed above, there is presented here a way of securing registration information sent between a UE and an IMS network during registration of the UE with the IMS network. FIG. 2 shows schematically the architecture of an exemplary system in which the approach may be implemented and FIG. 3 shows signalling associated with the approach.

Referring to FIG. 2, a UE is connected to a P-CSCF, which acts as the first point of contact for the UE in the signalling plane of the IMS network (represented in the figure by the cloud shape). The P-CSCF is connected to an S-CSCF, possibly via an I-CSCF, which acts as a central node of the signalling plane and handles, in conjunction with the HSS, SIP registration of the UEs.

Figure 3:
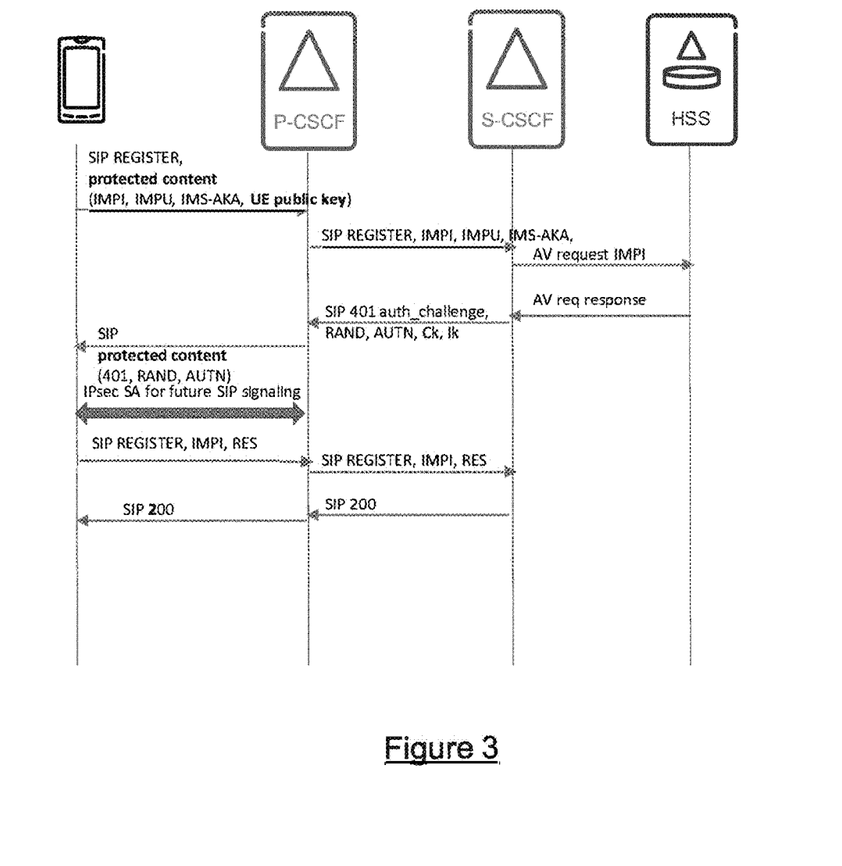
FIG. 3 shows signalling associated with a procedure for securely registering a UE with an IMS network according to an embodiment of the present invention.

FIG. 3 shows signalling for securely registering the originating UE with the IMS network according to an embodiment of the invention. The starting point for the signalling is after a P-CSCF has been assigned to the UE, for example after a P-CSCF discovery process has been completed and a Packet Data Network, PDN, connection established. The UE initiates registration by sending a SIP REGISTER message to the P-CSCF. Some or all of the content of the SIP message are protected using an encryption key, such as a public encryption key, belonging to the IMS or to the P-CSCF. Protection in this sense may comprise encrypting the content to prevent unauthorised access to it, but other examples of protecting the contents of the SIP message may include digitally signing the content to verify that it has not been tampered with. In this example, the protected content comprises registration information, such as an IMS Private Identifier (IMPI), IMPU, IMS-AKA parameters and a public encryption key belonging to the UE.

The IMS public key used to encrypt the contents of the SIP REGISTER may be contained in a certificate which is known to each subscriber to the IMS network. For example, the IMS public key/IMS certificate may be embedded in the SIM card of the UE, or retrieved from the network. The IMS retains a corresponding private key so that the P-CSCF can decrypt or verify the contents of the SIP REGISTER message protected using the public key. The private key may, for example, be stored by the P-CSCF or at another node of the IMS network and then retrieved by the P-CSCF to carry out the decryption. Alternatively, the decryption may be carried out by the IMS network node which stores the private key. After the protected contents are decrypted, the P-CSCF extracts and stores the UE's public key so that it can be used to secure the contents of the reply message sent from the P-CSCF to the UE.

As a minimum, one IMS certificate is needed to allow the UEs to encrypt the contents of the SIP REGISTER message. Alternatively, or in addition, there may be one public-key-containing certificate for each P-CSCF, although this may require more management within the IMS to set up the service.

The P-CSCF forwards the SIP REGISTER message to the S-CSCF, with the contents of the message now in plaintext. The S-CSCF then requests Authentication Vectors (AV) from the HSS using the IMPI provided in the initial SIP REGISTER message. The HSS responds with the AV, which are then used by the S-CSCF to construct a SIP 401 "authentication challenge" message comprising, for example, a random number as a "challenge" for the UE (RAND), an authentication value to authenticate the network (AUTN), a Confidentiality Key (CK) for use in an IPsec SA, and an Integrity Key (IK) for use in an IPsec SA. The P-CSCF receives the SIP 401 message and stores the confidentiality (CK) and integrity (IK) keys for subsequently establishing the IPsec SA. The P-CSCF sends a SIP message to the UE which comprises content protected using the UE's public key. In this example, the protected content includes the 401 response code, the random number (RAND) and the authentication value (AUTN).

The UE receives the SIP message and decrypts/verifies the protected contents using the private key counterpart of the UE public key. At this stage, the IPSec SA between the UE and the P-CSCF is established via IMS-AKA in order to (i) establish a secure connection for further SIP signalling between the UE and the P-CSCF and (ii) to mutually authenticate the UE and the P-CSCF. The UE sends a new SIP REGISTER message over this secure connection to the P-CSCF. The new SIP REGISTER message comprises the IMPI of the UE together with a response (RES) to the random number challenge (RAND) which authenticates the UE. The message is forwarded by the P-CSCF to the S-CSCF, which verifies the response (RES) and, if it is correct, replies with a SIP 200 message. The registration process is then completed by the P-CSCF forwarding the SIP 200 message to the UE.

The UE public-private key pair may be generated by the UE for the purpose of allowing the P-CSCF to transmit a secure reply to the initial SIP REGISTER message, i.e. a different pair of keys may be used each time the UE registers with the IMS. Alternatively, the UE may use the same key pair each time it registers with the IMS.

The use of public-private key encryption to secure the initial SIP REGISTER message and the P-CSCF response avoids the burden of establishing a TLS session, thereby saving valuable network bandwidth whilst improving IMS registration times.

FIG. 4 shows an example of a current SIP REGISTER message.

FIG. 5 shows how the SIP REGISTER message of FIG. 4 may modified according to the present invention. Some relevant changes to the message are highlighted in bold.

The SIP REGISTER message in this example comprises a field "Encrypted-content: <encrypted_data>" which is populated with the result of applying a cryptographic function, exemplified here generically as "asymetric_encryption_function", to encrypt the plaintext contents of the previous SIP REGISTER message using the IMS public key. The plaintext also includes the field "P-Client-Public-Key: 1243abcf124 . . . " which represents the UE public key.

Figure 6:
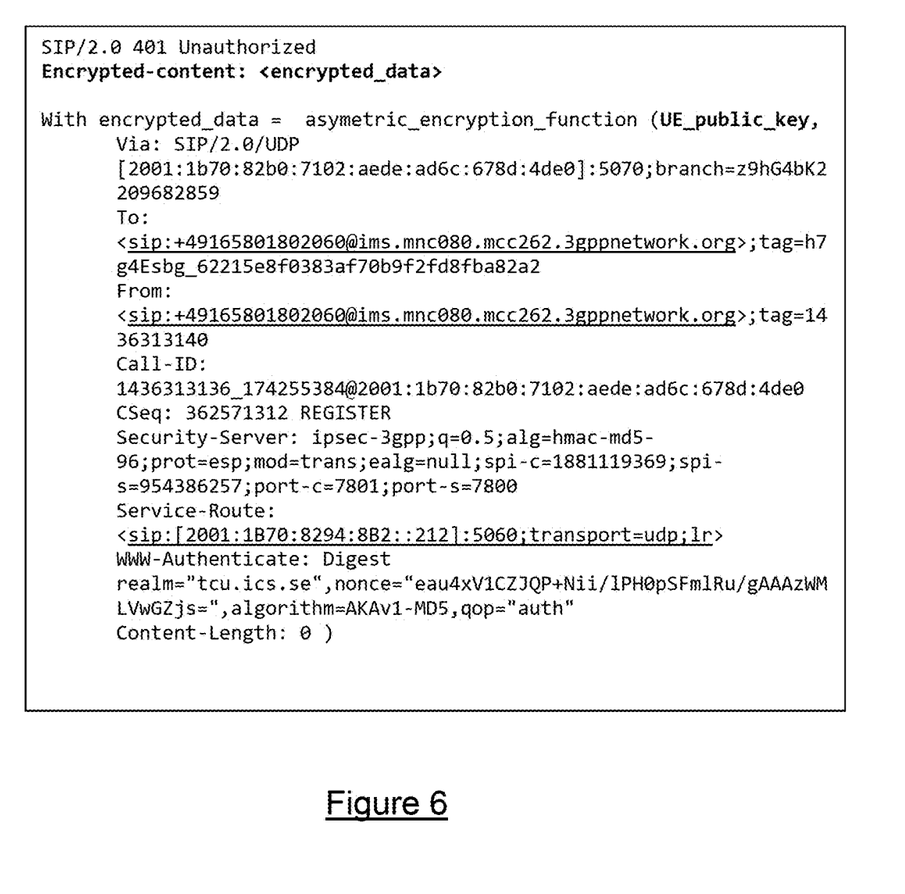
FIG. 6 shows a SIP 401 message according to according an embodiment of the present invention.

FIG. 6 shows a SIP 401 response returned by the P-CSCF to the UE. This message has a similar structure to the modified SIP REGISTER message, although in this case the UE public key is supplied as an input to the cryptographic function and there is no equivalent to the P-Client-Public-Key field because the UE already has (or has access to) the IMS public key.

As discussed above, the UE may be provided with the IMS public key well in advance of the UE attempting to register with the IMS. Alternatively, the UE can retrieve the IMS public key from the Packet Data Gateway (PGW) during the initial setup of the connection between the UE and the IMS, for example, during setup of the IMS packet data network (PDN).

Figure 7:
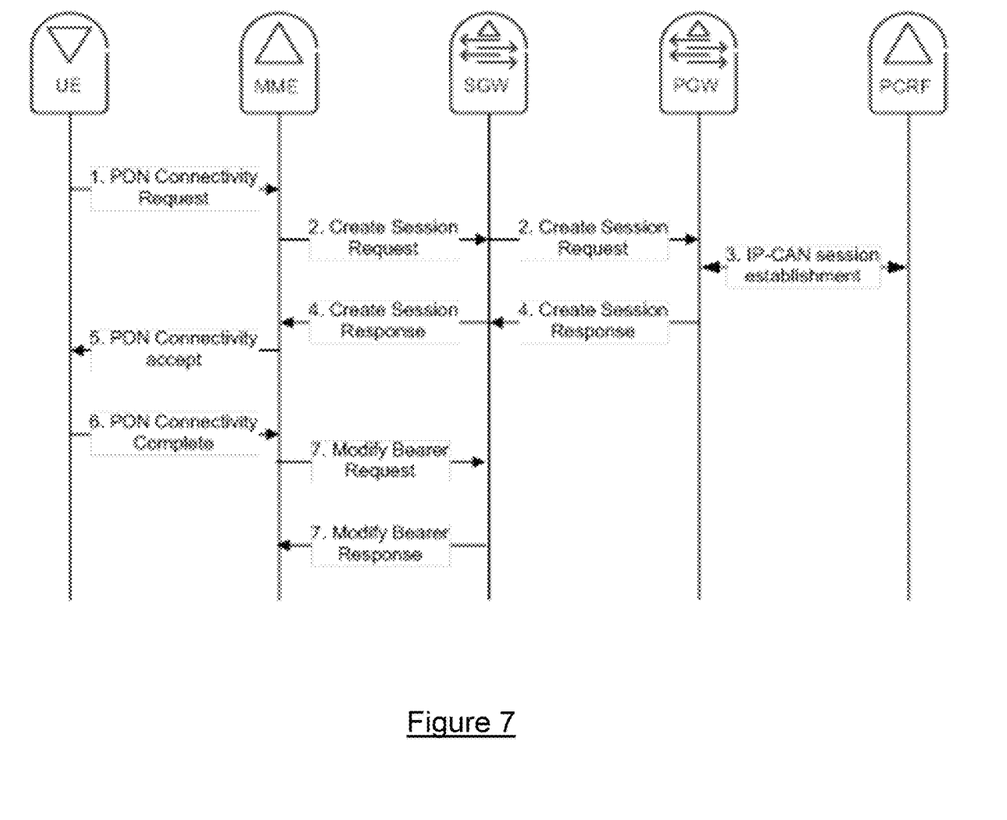
FIG. 7 shows signalling associated with establishing PDN connectivity for a UE attached to the IMS network.

FIG. 7 shows signalling involved in setting up the PDN connection between the UE and the IMS. The steps in the process are as follows, with steps 4 and 5 relating to the provision of the IMS (or P-CSCF) public key.

1. The UE sends a PDN connectivity request to the Mobility Management Entity (MME). If the UE intends to setup the IMS Access Point Name (APN), the well-known "ims" should be used as the APN name. If the XML Configuration Access Protocol (XCAP) is to be used, then the locally configured XCAP name would be used instead.

2. The MME checks that the requested APN is allowed to be used, and sends a "Create Session Request" to a PGW via a Signalling Gateway (SGW). The request may include default Quality of Service (QoS) settings for the APN such as the Quality Class Indicator (QCI), which for the IMS APN is "5".

3. If dynamic Policy and Charging Control (PCC) is used for the APN, the PGW establishes a new IP Connectivity Access Network (IP-CAN) session with a PCRF, which may provide additional QoS parameters (e.g. QCI; Allocation and Retention Priority (ARP) values).

4. The PGW acknowledges creation of the new PDN connection and sends a "Create Session Response" to the MME via the SGW. The response includes as well the IP address allocated and other information for the APN. For the IMS APN, the PGW additionally adds the address of the P-CSCF allocated to the UE and an IMS/P-CSCF certificate in the Protocol Configuration Option (PCO) field of the response. The certificate contains the IMS (P-CSCF) public key for use by the UE in encrypting the SIP REGISTER message during the registration procedure described above.

5. The MME sends a PDN connectivity "accept" back to the UE, including the APN information from the PGW, including an allocated IP address, and in the case of the IMS APN, the allocated P-CSCF addresses and the IMS/P-CSCF certificate.

6. The UE sends a PDN "connectivity complete" message to the MME.

7. The MME confirms the establishment of the PDN connection, and sends a Modify Bearer Request to the SGW (which acknowledges).

Alternatively, the IMS/P-CSCF certificate may be distributed to the UE during automatic device configuration via a device management protocol: when a UE connects to the operator's network and the network detects a new UE, a device configuration server may be invoked to configure the UE according to the operator's setup. This configuration step can include configuration of the IMS certificate containing the IMS public key.

Alternatively, the UE can be provided with the IMS/P-CSCF certificate during P-CSCF discovery via Dynamic Host Configuration Protocol, DHCP. For example, the UE can retrieve the IP address of the P-CSCF using DHCP option 120 and the information retrieved by the UE via DHCP may include the IMS/P-CSCF certificate.

Alternatively, the UE can automatically retrieve the IMS/P-CSCF certificate after P-CSCF discovery: after the UE has retrieved the IP address of the P-CSCF, the UE can send a request (e.g. an HTTP request) to the P-CSCF to retrieve the P-CSCF certificate, or the UE can send a Ut request to the IMS Application Server (see FIG. 1) to retrieve the IMS/P-CSCF certificate.

Alternatively, the UE can be manually configured with the IMS certificate. The user can download the operator's IMS/P-CSCF certificate via a web interface to the UE or a PC and configure it manually in the UE SIP or IMS settings.

Figure 8:
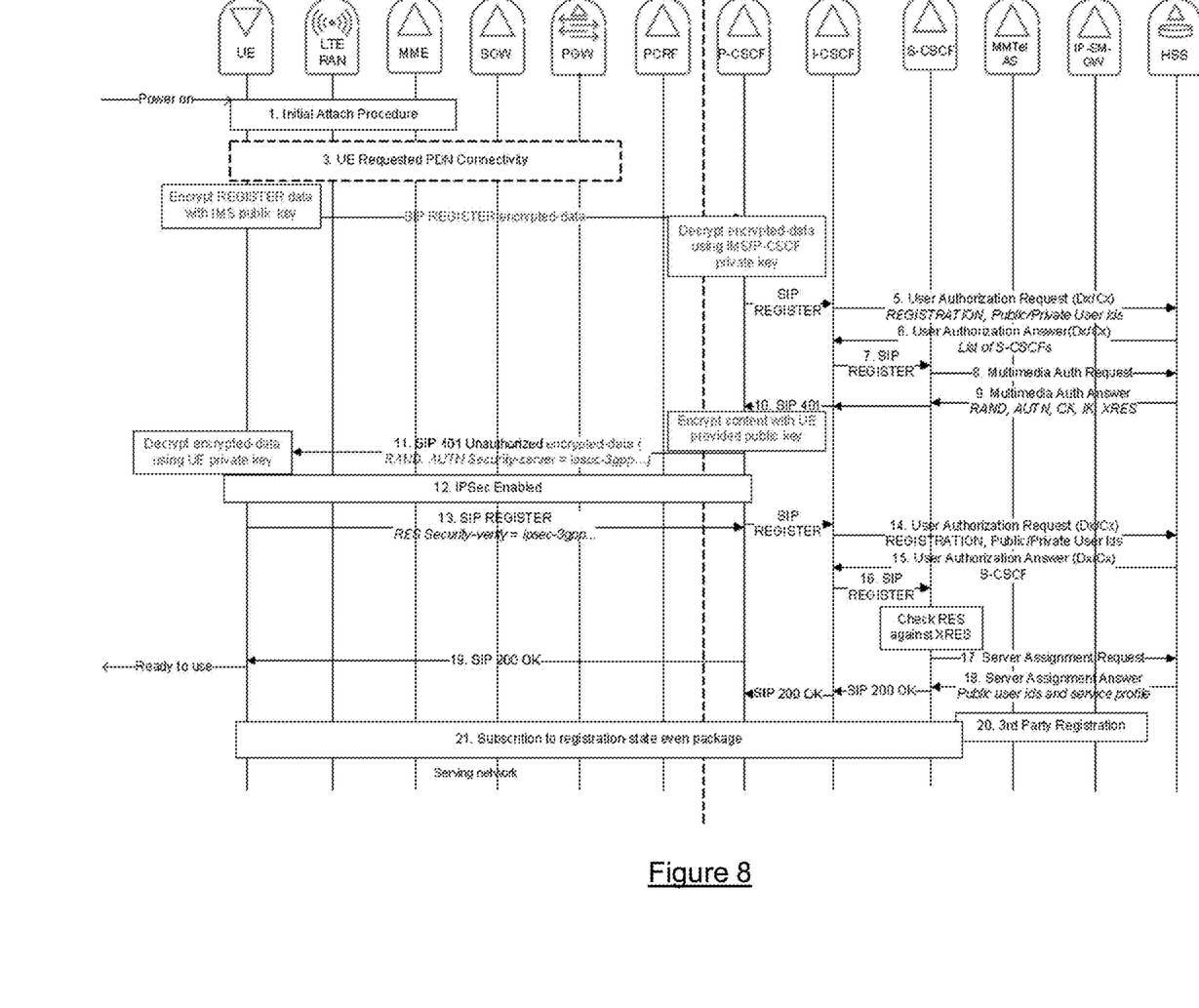
FIG. 8 shows further signalling associated with securely registering the UE with the IMS network.

FIG. 8 shows a more detailed example of the signalling shown in FIG. 3. In step 1, the UE is powered on and attaches to a Radio Access Network (RAN), in this case a Long Term Evolution (LTE) RAN. The UE then requests PDN connectivity, for example, using the procedure shown in FIG. 4. The UE is provided with the IMS (or P-CSCF) public key using one of the approaches discussed above. Steps (a)-(f) show the exchange of the SIP REGISTER/SIP response messages comprising encrypted information as described above. In this example, there is an I-CSCF between the P-CSCF and the S-CSCF, which performs a User Authorization Request (step 5) in order to register the UE at the HSS. The HSS responds to the I-CSCF with a list of S-CSCFs which may handle the registration of the UE (Step 6), which then proceeds via one of these S-CSCFs (steps 7-9).

Figure 9:
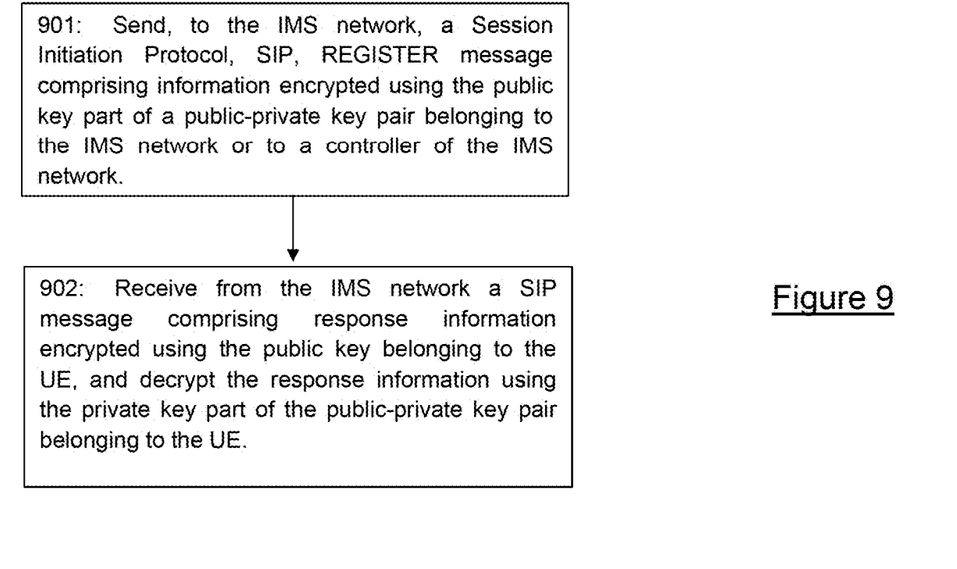
FIG. 9 is a flow diagram illustrating a method carried out by a UE during registration with an IMS network.

FIG. 9 is a flow diagram illustrating a method carried out by an apparatus configured as a UE for connecting to an IMS network. In the first step (901), the UE sends to the IMS network a SIP REGISTER message comprising information encrypted using the public key part of a public-private key pair belonging to the IMS network or to a controller of the IMS network. Then (step 902), the UE receives from the IMS network a SIP message comprising response information encrypted using the public key belonging to the UE, and decrypts the response information using the private key part of the public-private key pair belonging to the UE.

Figure 10:
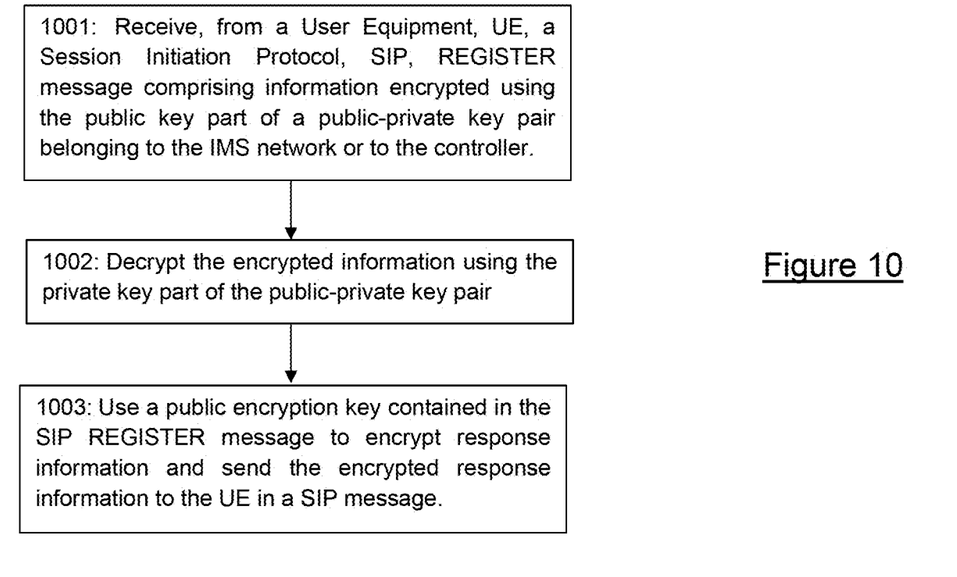
FIG. 10 is a flow diagram illustrating a method carried out by a Control Function apparatus of the IMS network.

FIG. 10 is a flow diagram illustrating a method carried out by an apparatus configured as a controller of the IMS, such as a P-CSCF. In the first step (1001), the controller receives, from a User Equipment, UE, a SIP REGISTER message comprising information encrypted using the public key part of a public-private key pair belonging to the IMS network or to the controller. Next (step 1002), the controller decrypts the encrypted information using the private key part of the public-private key pair. Then (step 1003), the controller uses a public encryption key contained in the SIP REGISTER message to encrypt response information and send the encrypted response information to the UE in a SIP message.

Figure 11:
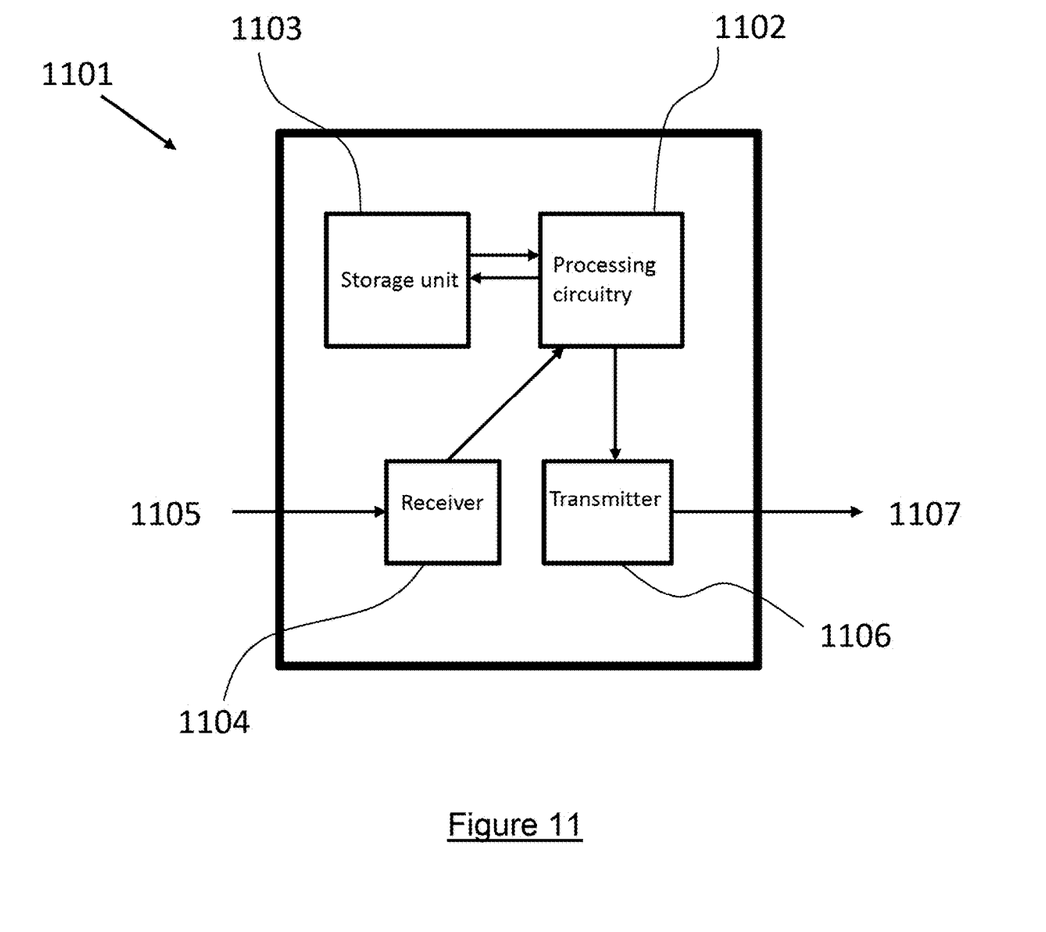
FIG. 11 is a schematic diagram of an apparatus according to an embodiment of the present invention.

FIG. 11 is a schematic diagram of an exemplary apparatus 1101 for carrying out the above-described methods. The apparatus 1101 comprises: processor circuitry 1102; a storage unit 1103 storing instructions executable by the processor circuitry 1102, a receiver 1104 for receiving messages 1105 and a transmitter 1106 for transmitting messages 1107. The apparatus may be configured to operate as a UE or as a controller of the IMS, in particular, as a P-CSCF.

The invention claimed is:

1. A method of securely registering a User Equipment, UE, with an IP Multimedia Subsystem, IMS, network, the method comprising:
    sending from the UE to the IMS network, a Session Initiation Protocol, SIP, REGISTER message comprising information encrypted using the public key part of a public-private key pair for the IMS network or for a controller of the IMS network;
    receiving the SIP REGISTER message at the IMS network or the controller of the IMS network; and
    and decrypting the encrypted information using the private key part of the public-private key pair of the IMS network or the controller of the IMS network,
    wherein decrypting the encrypted information occurs only in response to the SIP REGISTER message comprising an indicator to indicate that the message comprises encrypted information.

2. A method according to claim 1, wherein the information comprises one or more of: an IMS Private Identifier, IMPI; an IMS Public Identifier, IMPU; and IMS Authentication and Key Agreement, IMS-AKA, data.

3. A method according to claim 2, wherein the information further comprises the public key part of a public-private key pair for the UE.

4. A method according to claim 3 and comprising, at the UE, receiving from the IMS network a SIP 401 response message comprising response information encrypted using the public key for the UE.

5. A method according to claim 4, wherein the response information comprises an authentication value for the IMS network and/or a random number generated by the IMS network as an authentication challenge for the UE.

6. A method according to claim 1, wherein the public-private key pair for the IMS network or for the controller of the IMS network belongs to a controller of the IMS network acting as a Proxy Call Session Control Function, P-CSCF.

7. A method according to claim 1, wherein the step of decrypting the encryption information is performed by a node of the IMS network other than the controller.

8. A method according to claim 1, wherein the IMS public key is stored at the UE, optionally in a Universal Integrated Circuit Card, UICC, prior to the UE connecting to the IMS network.

9. A method according to claim 1, and comprising, at the UE, receiving the IMS public key from a node of the IMS network or from a node of an access network through which the IMS network is accessed.

10. A method according to claim 9, wherein the node is a Packet Data Gateway, PGW of an access network through which the IMS network is accessed.

11. A method according to claim 9, wherein the node is a Dynamic Host Configuration Protocol, DHCP, server of the access network.

12. A method according to claim 9, wherein the node is a device configuration server of the IMS or a controller of the IMS network acting as a P-CSCF or an Application Server of the IMS.

13. A method according to claim 3, wherein the public-private key pair for the UE is generated by the UE.

14. An apparatus configured to operate as a controller of an IP Multimedia Subsystem, IMS, network, the apparatus comprising: processor circuitry; a storage unit storing instructions executable by the processor circuitry, a receiver for receiving messages and a transmitter for sending messages, whereby the apparatus is operable to:
receive, from a User Equipment, UE, a Session Initiation Protocol, SIP, REGISTER message comprising information encrypted using the public key part of a public-private key pair for the IMS network or for the controller; and
decrypt the encrypted information using the private key part of the public-private key pair, whereby the apparatus is operable to decrypt the encrypted information only in response to the SIP REGISTER message comprising an indicator to indicate that the information is encrypted.

15. An apparatus according to claim 14, whereby the apparatus is operable to use a public encryption key contained in the SIP REGISTER message to encrypt response information and to send the encrypted response information to the UE in a SIP 401 response message.

16. An apparatus according to claim 14, configured to operate as a Proxy Call Session Control Function, P-CSCF.

17. An apparatus configured to operate as a User Equipment of an IP Multimedia Subsystem, IMS, network, the apparatus comprising: processor circuitry; a storage unit storing instructions executable by the processor circuitry, a receiver for receiving messages and a transmitter for sending messages, whereby the apparatus is operable to:
encrypt information using the public key part of a public-private key pair for the IMS network or for a controller of the IMS network; and
send to the IMS network a Session Initiation Protocol, SIP, REGISTER message comprising the encrypted information,
whereby the apparatus is operable to receive from the IMS network a SIP message comprising response information encrypted using the public key for the UE, and decrypt the response information using the private key part of the public-private key pair for the UE.

18. An apparatus according to claim 17, wherein the information comprises a public key part of a public-private key pair for the UE.

* * * * *